(12) United States Patent
Moctezuma et al.

(10) Patent No.: US 11,914,459 B2
(45) Date of Patent: Feb. 27, 2024

(54) AUTOMATED IDENTIFICATION OF WEBSITE ERRORS

(71) Applicant: American Express Travel Related Services Company, Inc., New York, NY (US)

(72) Inventors: Jesus Alberto Leon Moctezuma, Phoenix, AZ (US); Amit Mondal, Phoenix, AZ (US); Karla D. Rosette, Phoenix, AZ (US); Ayuna Tckachenko, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 17/586,430

(22) Filed: Jan. 27, 2022

(65) Prior Publication Data

US 2023/0214288 A1    Jul. 6, 2023

Related U.S. Application Data

(60) Provisional application No. 63/266,200, filed on Dec. 30, 2021.

(51) Int. Cl.
| | | |
|---|---|---|
| *G06F 11/00* | (2006.01) | |
| *G06F 11/07* | (2006.01) | |
| *G06N 20/20* | (2019.01) | |
| *H04L 67/02* | (2022.01) | |
| *G06F 18/214* | (2023.01) | |

(52) U.S. Cl.
CPC ........ *G06F 11/0772* (2013.01); *G06F 11/079* (2013.01); *G06F 11/0793* (2013.01); *G06F 18/214* (2023.01); *G06N 20/20* (2019.01); *H04L 67/02* (2013.01)

(58) Field of Classification Search
CPC ............ G06F 11/3452; G06F 11/0709; G06F 11/076; G06F 11/0778; G06F 11/079; G06F 11/3438; G06F 11/0754; G06F 11/3447; G06F 11/3419
See application file for complete search history.

(56) References Cited

U.S. PATENT DOCUMENTS

| | | | |
|---|---|---|---|
| 8,966,036 B1 * | 2/2015 | Asgekar ................. | H04W 4/08 |
| | | | 707/706 |
| 2022/0159022 A1 * | 5/2022 | Aghamirzaei ..... | G06Q 30/0248 |
| 2022/0292074 A1 * | 9/2022 | Zhang .................. | G06F 11/302 |

* cited by examiner

*Primary Examiner* — Charles Ehne
(74) *Attorney, Agent, or Firm* — Thomas Horstemeyer, LLP

(57) ABSTRACT

Systems and methods for automated detection of website errors during a sequence of device interactions with a website. In one example, a computing device is configured to receive a website navigation sequence of a series of web page interactions between a client device and a website. The computing device can determine a predicted completion time for a next measurement of the client device executing the website navigation sequence. An actual completion time for the next measurement of the client device executing the website navigation sequence can be determined. Then, the computing device can determine an anomaly website event based on the actual competition time failing to meet a boundary threshold. The anomaly website event is determined to be a website error based on a second machine learning model being trained with a plurality of previous website errors identified from a plurality of previous website navigation sequences.

20 Claims, 8 Drawing Sheets

Manual Anomaly Labelling Tool

| Business Unit | Device | Website Navigation Sequences 145 | Share Anomaly | Time Anomaly | Anomaly Type 122 |
|---|---|---|---|---|---|
| Consumer | Desktop | Error Page > Start App | X | ✓ | |
| Consumer | Desktop | Hilton Landing Page | ✓ | X | ▷ |
| Consumer | Desktop | Offer Not Available | ✓ | X | LTO |
| Consumer | Desktop | Start App > Error Page | ✓ | X | New Tag |
| Consumer | Desktop | Start App > TnC > SuppOffered | ✓ | ✓ | Technical Error |
| Consumer | Desktop | System Not Responding | ✓ | X | |
| Consumer | Mobile | Hilton Landing Page | ✓ | X | |
| Consumer | Mobile | Start App > TnC > Supp Off | ✓ | X | |
| Consumer | Mobile | Start App > Error Page | ✓ | X | |

FIG. 2B

AUTOMATED IDENTIFICATION OF WEBSITE ERRORS

CROSS-REFERENCE TO RELATED APPLICATIONS

This application claims priority to, and the benefit of, co-pending U.S. Provisional Application No. 63/266,200, filed on Dec. 30, 2021, entitled "AUTOMATED IDENTIFICATION OF WEBSITE ERRORS," which is incorporated by reference in its entirety.

BACKGROUND

A website can have various individual web pages. Overtime, users can experience an error viewing one or more of the web pages. In some cases, the error can be reported by the users. In other cases, the error can be ignored because the user abandons the website. Typically, when an error is reported by a user, the website owner will analyze a particular web page to identify the source of the error.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2A-2C are example analyst user interfaces displayed on a client device in the networked environment of FIG. 1A according to various embodiments of the present disclosure.

DETAILED DESCRIPTION

Figure 1A:
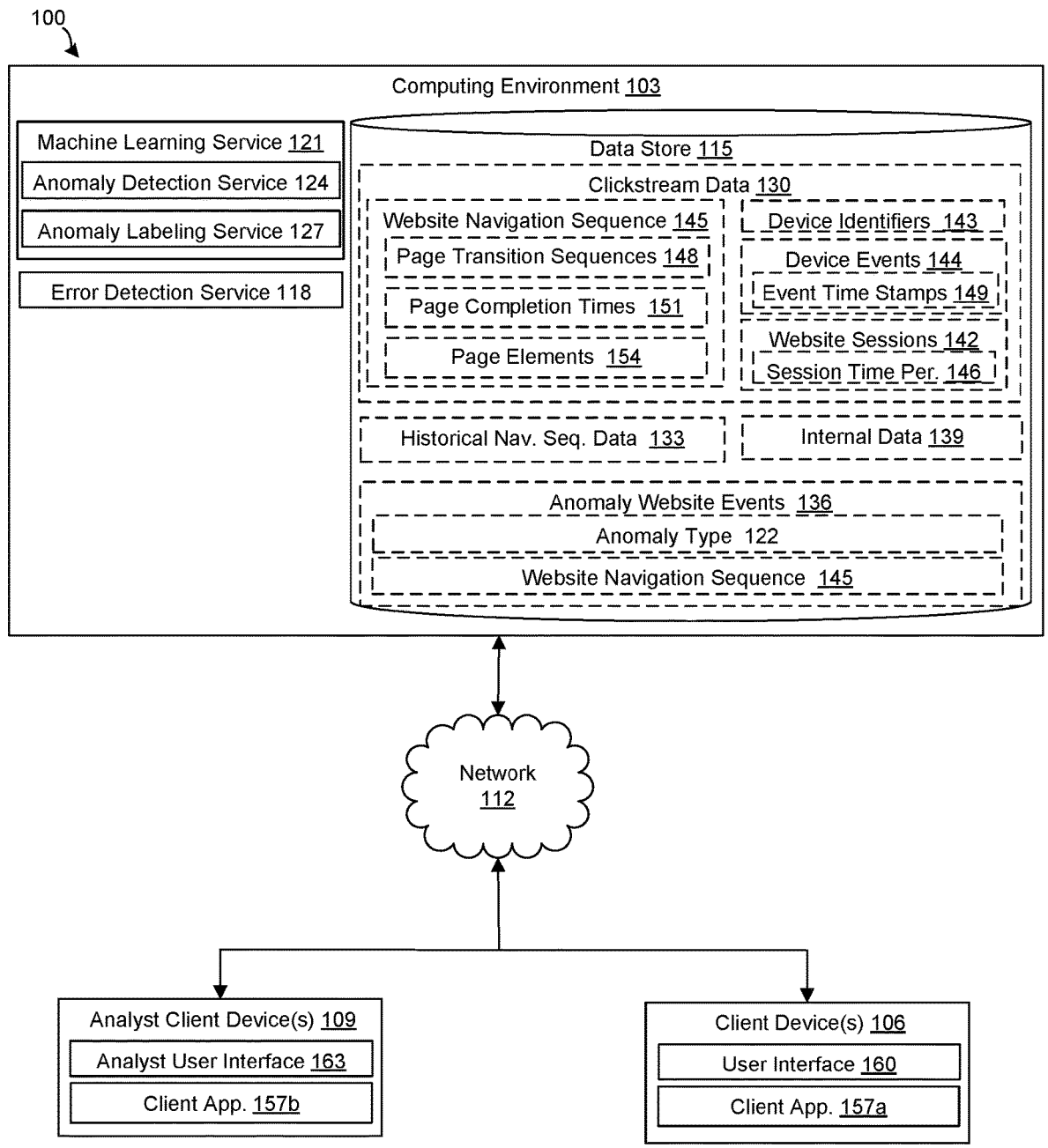
FIG. 1A is a drawing of a networked environment according to various embodiments of the present disclosure.

The present disclosure relates to the automated detection of website errors during a sequence of client device interactions with a website. Website errors can prevent a user from performing a task or viewing certain content. Errors can worsen the user experience on the website, which can lead to loss of website traffic and commerce conducted on a website.

Typically, when an error is reported by a user, the website owner will analyze a particular web page to identify the source of the error. However, some website errors can be difficult to recreate. For instance, an error can only appear under certain conditions or when a client device of a user executes a particular sequence of interactions with one or more web pages.

In other situations, the errors can be caused by many factors, such as technical issues, network issues, customer input errors, user interface design deficiencies, imperfect code used to generate the web pages, or website rendering problems on the customer's browser, operating system, or another device combination. Some of these errors can be unknown or unpredictable at the time of the creation of a website/mobile app. Many of these errors can be undetectable by current digital analytics tools. Generally, digital troubleshooting teams depend on predefined tagging techniques to create clickstream data from interactions between the client device and the website. Since most errors cannot be defined ahead of time, the errors are not tagged and thus cannot be captured by the clickstream data pipeline. Also, it can be difficult to distinguish between a user leaving a website or web page (e.g., a customer did not like the products being sold or the content of the page) and errors encountered by the customer as they navigate one or more web pages.

Also, current digital analytics tools can be focused on a web page level or a module level of a web page. Page level conversion data cannot distinguish between customer intent led drop offs versus error led drop offs. Doing a full deep dive on the code base by engineering teams or surveying customers is both slow & expensive, and in many cases, infeasible to investigate numerous possible website sequences. Companies also have thousands of pages on their website/app, which allows for numerous potential sequence paths. Thus, a manual review process for investigating every possible sequence paths on an entire website for a potential error is unworkable.

Thus, the embodiments of the present disclosure relate to various improvements related to detecting and identifying errors in websites that cannot be discovered by conventional digital analytics tools. For example, the embodiments of the present disclosure are directed to improved approaches that identify anomaly website events (e.g., potential website errors) from a website navigation sequence performed by a client device on a website and automate the identification of website errors from the detected anomaly website events (e.g., identifying technical website errors from other causes of the anomaly website events). In other examples, the embodiments are directed to improved approaches include display an interactive user interface for receiving a classification of the anomaly website event (e.g., classifying the cause of the anomaly website event, such as a technical website error, a promotional offer, a market trend, etc.) and using the classification to update one or more machine learning models used for detecting and classifying the anomaly website events and reconstruct website navigation sequences of various client devices interacting with a website from the clickstream data.

In the context of the present disclosure, a website can refer to content and functionality displayed on various devices, such as a personal computer, a laptop, a mobile device, a smartphone, a tablet, and other suitable devices. As such, the content and functionality of the website can be displayed in different formats depending on the device and/or browser executed on the device. The embodiments of the present disclosure also include detecting and identifying errors in content and functionality displayed on mobile devices (e.g., smartphones, tablets, and other suitable devices). In the following discussion, a general description of the system and its components is provided, followed by a discussion of the operation of the same.

With reference to FIG. 1A, shown is a networked environment 100 according to various embodiments. The networked environment 100 includes a computing environment 103, a client device 106, and an analyst client device 109, which are in data communication with each other via a network 112. The network 112 includes, for example, the Internet, intranets, extranets, wide area networks (WANs), local area networks (LANs), wired networks, wireless networks, or other suitable networks, etc., or any combination of two or more such networks. For example, such networks can comprise satellite networks, cable networks, Ethernet networks, and other types of networks.

The computing environment 103 can be comprise, for example, a server computer or any other system providing computing capability. Alternatively, the computing environment 103 can be employ a plurality of computing devices that can be arranged, for example, in one or more server banks or computer banks or other arrangements. Such computing devices can be located in a single installation or can be distributed among many different geographical locations. For example, the computing environment 103 can be include a plurality of computing devices that together can be comprise a hosted computing resource, a grid computing resource and/or any other distributed computing arrangement. In some cases, the computing environment 103 can be correspond to an elastic computing resource where the allotted capacity of processing, network, storage, or other computing-related resources can vary over time.

Various applications and/or other functionality can be executed in the computing environment 103 according to various embodiments. Also, various data is stored in a data store 115 that is accessible to the computing environment 103. The data store 115 can be representative of a plurality of data stores 115 as can be appreciated. The data stored in the data store 115, for example, is associated with the operation of the various applications and/or functional entities described below.

The components executed on the computing environment 103, for example, can be include an error detection service 118 and a machine learning service 121, and other applications, services, processes, systems, engines, or functionality not discussed in detail herein. The error detection service 118 can be executed to identify anomaly website events experienced by client device 106 and to predict an anomaly type 122 (e.g., predict which of the anomaly website events are technical errors) for each of the anomaly website events. The error detection service 118 can also execute to display one or more user interfaces for the analyst client devices 109 to review anomaly website event data and provide feedback that is used to supervise the training of the machine learning modes hosted by the machine learning service 121.

The machine learning service 121 can be executed to provide access to machine learning models for identifying and labeling website errors. The machine learning models can be accessed by the error detection service 118. The machine learning service 121 can host machine learning models for an anomaly detection service 124 and for an anomaly labeling service 127.

The anomaly detection service 124 can be executed to identify anomaly website events from a sequence of events performed by a client device 106 on a website. For example, a sequence can include the client device 106 first accessing a website title page, and then clicking a hyperlink for filling out an application for service provided by the website owner. Next, the sequence can involve recording the data entered in particular data fields in the one or more web pages used for the application process. Other sequences can vary in length, and the device events that are recorded can vary.

The anomaly labeling service 127 can be executed to determine an anomaly type 122 for each anomaly website event. The anomaly website events classified as technical errors can be forwarded to an engineering team for further analysis. Other anomaly types 122 can be stored and used for visualization user interface tools. In addition to a technical error, some other non-limiting examples of anomaly types 122 can include a limited time offer (e.g., a promotional offer), a seasonal trend, a market trend or shift, a new tag category (e.g., digital data collection techniques).

The data stored in the data store 115 includes, for example, clickstream data 130, historical navigation sequence data 133, anomaly website events 136, internal data 139, and potentially other data. The clickstream data 130 can represent data generated from the interactions of client devices 106 with a website. Some non-limiting examples of clickstream data 130 can include website sessions 142, device identifiers 143, device events 144, website navigation sequences 145, and other suitable interaction data that can be recorded. Further, the clickstream data 130 can be associated different clickstream metrics or derived clickstream data. For example, the clickstream metrics can include a volume of client device visits or a volume of website sessions 142 that indicate a client device 106 navigated through a particular website navigation sequence 145. An absolute value, a percentage or share from one or more total values of the clickstream metrics can be calculated. The clickstream metrics can also include an amount time of spent during a website session 142.

The website sessions 142 (e.g., website session identifiers) can represent a device session in which a particular client device 106 is actively interacting with a website. In some embodiments, a start time for a website session 142 can occur when a client device 106 arrives at a website. The end time for the website session 142 can occur after a period of inactivity (e.g., 45 minutes), an explicit termination (e.g., a browser application is closed, a browser tab is closed, the client device 106 leaves the website for a new website), accumulating a threshold quantity of website hits within a pre-defined time period associated with bot activity, and other suitable closure activity. The website sessions 142 can include data related to various tasks or interactions performed with the website during the website session 142. Each website session 142 can include a session time period 146 which represents a period of time that the client device 106 is actively interacting with the website. Each website session 142 can also have a unique identifier assigned.

The device identifiers 143 can represent a unique identifier assigned to every unique client device 106 interacting with the website. The device events 144 can represent unique interactions performed by the client device 106 on the website during a website session 142. Each device event 144 can be assigned an event time stamp 149 that indicates a point in time in which the device event 144 occurred. Some non-limiting examples of device events 144 can include viewing a web page, clicking a user interface button on the website, viewing a portion of the web page for a period of time, entering data into a data field of the web page, starting a task, completing a task, abandoning a task, clicking on scrolling components on the web page, selecting (e.g., clicking on a particular portion of the web page) and other suitable device events 144 performed on the website.

The website navigation sequences 145 can include page transition sequences 148, page completion times 151, and page elements 154. The page transition sequence 148 can represent web pages that were visited and a sequence in which the web pages were visited during a website session 142 (e.g., a website session identifier) for a particular client device 106. The page completion times 151 can represent one or more periods of time associated with a sequence of device events 144, a page transition sequence 148, a completion of one or tasks (e.g., filling out an application, filling out a series of forms over multiple web pages, completing a survey or a quiz, etc.), and other suitable tasks that can be timed. The page elements 154 can represent user interface components and the content on a web page.

In some embodiments, the website navigation sequence 145 can refer to a specific sequence of device events 144, and the specific sequence is constructed or assembled from the clickstream data 130. The clickstream data 130 can be collected from a website using various digital data collection techniques, such as using JavaScript tags, a tag manager, server-side tagging, and other suitable digital data collection techniques.

The historical navigation sequence data 133 can represent previously recorded website navigation sequence data from a prior time period of clickstream data 130. For example, clickstream data 130 can represent data collected for a present day, a week, a month, a year, or some other suitable time period. The historical navigation sequence data 133 can represent a preceding time period or set of preceding time periods.

The anomaly website events 136 can represent events that are identified by the anomaly detection service 124 as meriting further analysis for a potential technical error. The anomaly website events 136 can be detected based at least in part on a comparison between a predicted measurement (e.g., a page completion time for completing a sequence of web page visits or completing a task on the website) related to a clickstream data element and an actual measurement for the clickstream data element. Anomaly website events 136 can be caused by a variety of factors, such as technical website errors, promotional offers, market trends, seasonal trends, and other suitable factors.

The internal data 139 can represent data stored by an organization or an entity related to previous interactions with a website. For example, internal data can include a status of previous interactions regarding whether a service was performed for a client device 106, the status of an application (e.g., an approved or declined transaction account, credit limits, previous user profile history, etc.), and other suitable data indicating a previous interaction between the website and user profile or a client device 106 of a user. In some embodiments, the internal data 139 can be merged with the clickstream data 130. For instance, the internal data 139 can be merged with the clickstream data 130 in order to reconstruct or generate a website navigation sequence 145 for a device identifier 143.

The anomaly website events 136 can represent various events identified from the website navigation sequence 145 that could potentially be classified as a technical error. The anomaly website events 136 can be detected by the anomaly detection service 124. The anomaly website events 136 can be classified as an anomaly type 122 (e.g., as a technical error) by the anomaly labeling service 127. An authorized operator can desire to investigate the cause of one or more anomaly website events 136 of a particular anomaly type 122.

The client device 106 and the analyst client device 109 are representative of a plurality of client devices that can be coupled to the network 112. The client device 106 and the analyst client device 109 can comprise, for example, a processor-based system such as a computer system. Such a computer system can be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 and the analyst client device 109 can include a display. The display can comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 can be configured to execute various applications such as a client application 157a and/or other applications. The client application 157a can be executed in a client device 106, for example, to access network content served up by the computing environment 103 and/or other servers, thereby rendering a user interface 160 on the display. To this end, the client application 157a can comprise, for example, a browser, a dedicated application, etc., and the user interface 160 can comprise a network page, an application screen, etc. The client device 106 can be configured to execute applications beyond the client application 157a such as, for example, email applications, social networking applications, word processors, spreadsheets, and/or other applications.

The analyst client device 109 can be configured to execute various applications such as a client application 157b and/or other applications. The client application 157b can be executed in an analyst client device 109, for example, to access network content served up by the computing environment 103 and/or other servers, thereby rendering an analyst user interface 163 on the display. To this end, the client application 157b can be comprise, for example, a browser, a dedicated application, etc., and the analyst user interface 163 can be comprise a network page, an application screen, etc. The analyst client device 109 can be configured to execute applications beyond the client application 157b such as, for example, email applications, social networking applications, word processors, spreadsheets, and/or other applications. In some embodiments, the analyst client device 109 can be restricted to authorized users.

The analyst user interface 163 can be used to display user interface visualization components related to the identification and classification of anomaly website events 136. For example, the analyst user interface 163 can be used to display various visualization graphs (e.g., FIG. 2A) related to website navigation sequences 145, anomaly website events 136, and other suitable data. The analyst user interfaces 163 can also provide user interface components that allow authorized users to classify an anomaly website event 136 as a valid anomaly website 136 and identify an anomaly type 122 for the anomaly website event 136. The identification of the anomaly type 122 can be used as training data for the anomaly detection service 124 and the anomaly labeling service 127. In some embodiments, the analyst user interface 163 can be restricted to authorized users (e.g., an analyst, a software developer, etc.) of an entity (e.g., a company) managing the website.

Figure 1B:
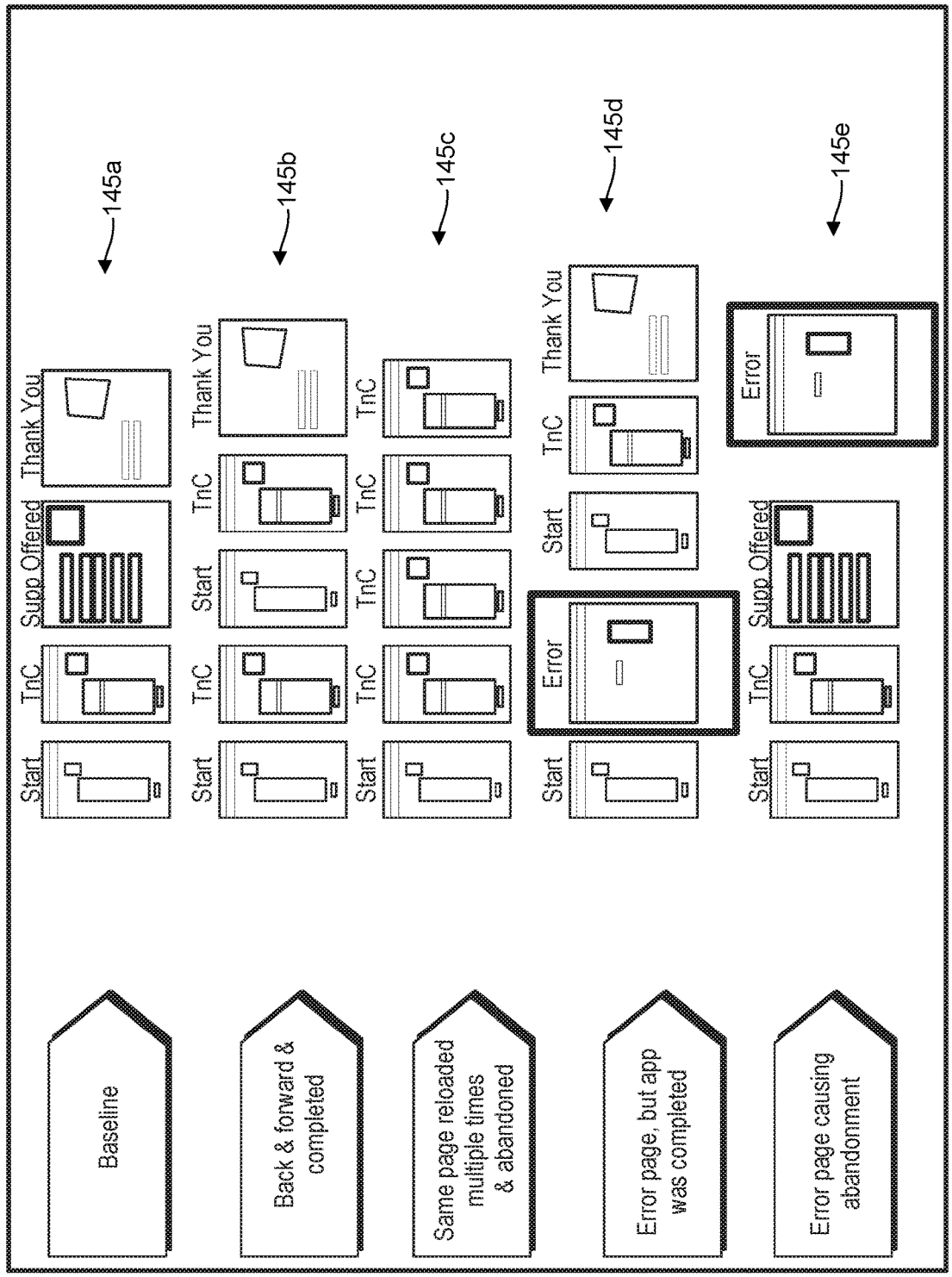
FIG. 1B is a drawing of example website navigation sequences of a client device interacting with a website according to various embodiments of the present disclosure.

Referring next to FIG. 1B, shown are example website navigation sequences 145a-145e associated with a website. For example, a first website navigation sequence 145a can represent a baseline sequence for a particular client device 106. The baseline sequence can represent an ideal sequence in which there are no anomaly website events 136, such as promotional offers, abnormal events, market trends, or technical errors. In some scenarios, the baseline sequence can have a page completion time 151 with the shortest measured time among the website navigation sequences 145a-e. In other examples, the baseline sequence or other website navigation sequences 145 can be evaluated by other clickstream data 130 (e.g., clickstream metrics), such as an average volume per period of time or a percentage of a total quantity of client device visits. In the first website navigation sequence 145a, the client device 106 displayed a "Start" web page, then a "Terms and Conditions" web page, then a "Supplemental Offer" web page, and finally a "Thank you" web page is displayed by the client device 106.

The second website navigation sequence 145b can represent a sequence in which an anomaly website event 136 occurs because the "Start" web page is displayed for a second time after the "Term and Conditions" web page. Despite the anomaly website event 136, the client device 106 was still able to complete the sequence for applying for a promotional offer. However, the page completion time 151 will likely be higher than the first website navigation sequence 145 because of the anomaly website event 136.

The third website navigation sequence 145c can represent a sequence in which an anomaly website event 136 occurs because the "Terms and Conditions" web page is displayed multiple times. The client device 106 is not able to proceed past the "Terms and Conditions" web page. As such, the client device 106 is not able to finish the task of applying for a supplemental offer.

The fourth website navigation sequence 145d can represent a sequence in which an anomaly website event 136 occurs because the client device 106 experiences a technical error (e.g., after displaying the "Start" web page). Likewise, the fifth website navigation sequence 145e can represent a sequence in which an anomaly website event 136 occurs because the client device 106 also experiences a technical error. In the fourth website navigation sequence 145d, the technical error is experienced at a different point in the sequence. In the fourth website navigation sequence 145d, the client device 106 reached the end of the sequence (e.g., completed the task). In the fifth website navigation sequence 145e, the client device 106 experienced a technical error and did not reach the end of the sequence because of the technical error. Thus, four of the five website navigation sequences 145 experienced an anomaly website event 136. However, in some instances, not all of the anomaly website events 136 are caused by a technical error. For example, website navigation sequences 145d and 145e can be identified as anomaly website events 136 and can be classified (e.g., tagged) as technical errors by the anomaly labeling service 127. Website navigation sequences 145b and 145c can be identified as anomaly website events 136 and can be referred to a support team for further analysis. After an investigation, the support team may determine the anomaly website events 136 are associated with a technical error.

Next, a general description of the operation of the various components of the networked environment 100 is provided. To begin, it is assumed that various client devices 106 have visited a website managed by an entity. In one non-limiting example, the users of the various client devices 106 have a similar intent to review promotional offers and to accept one of the promotional offers provided by the entity. Although having the same intent and starting from the same web page, some of the client devices 106 have different website navigation sequences 145a-e (see e.g., FIG. 1B).

The error detection service 118 can receive the website navigation sequences 145 associated with a first time period (e.g., week one). The error detection service 118 can use an anomaly detection service 124 (e.g., via a machine learning model) to determine a predicted value for a metric (e.g., a page completion time 151) associated with each of the website navigation sequences 145 for a second time period (e.g., week two) based at least in part on the data (e.g., page completion time 151) associated with the website navigation sequence 145 from the first time period. The predicted value can be used to determine a boundary threshold for the second time period. Then, the error detection service 118 can identify the actual value measurement for the second time period and compare it to the boundary threshold. If the actual value measurement exceeds the boundary threshold, then the error detection service 118 can identify the website navigation sequence 145 as having an anomaly website event 136.

The error detection service 118 can provided the one or more website navigation sequences 145 having an anomaly website event 136 to the anomaly labeling service 127. The anomaly labeling service 127 can determine an anomaly type 122 and provide the anomaly type 122 to the error detection service 118. The anomaly labeling service 127 can use one or more machine learning models to classify the anomaly website event 136 (e.g., determine which of the anomaly website events are the result of a technical error or if there is another reason for the anomaly website event 136). Thus, the error detection service 118 has identified a limited set of website navigation sequences 145 that are causing technical errors on the website. This limited set can be referred to a software development team for in-depth analysis.

Figure 2A:
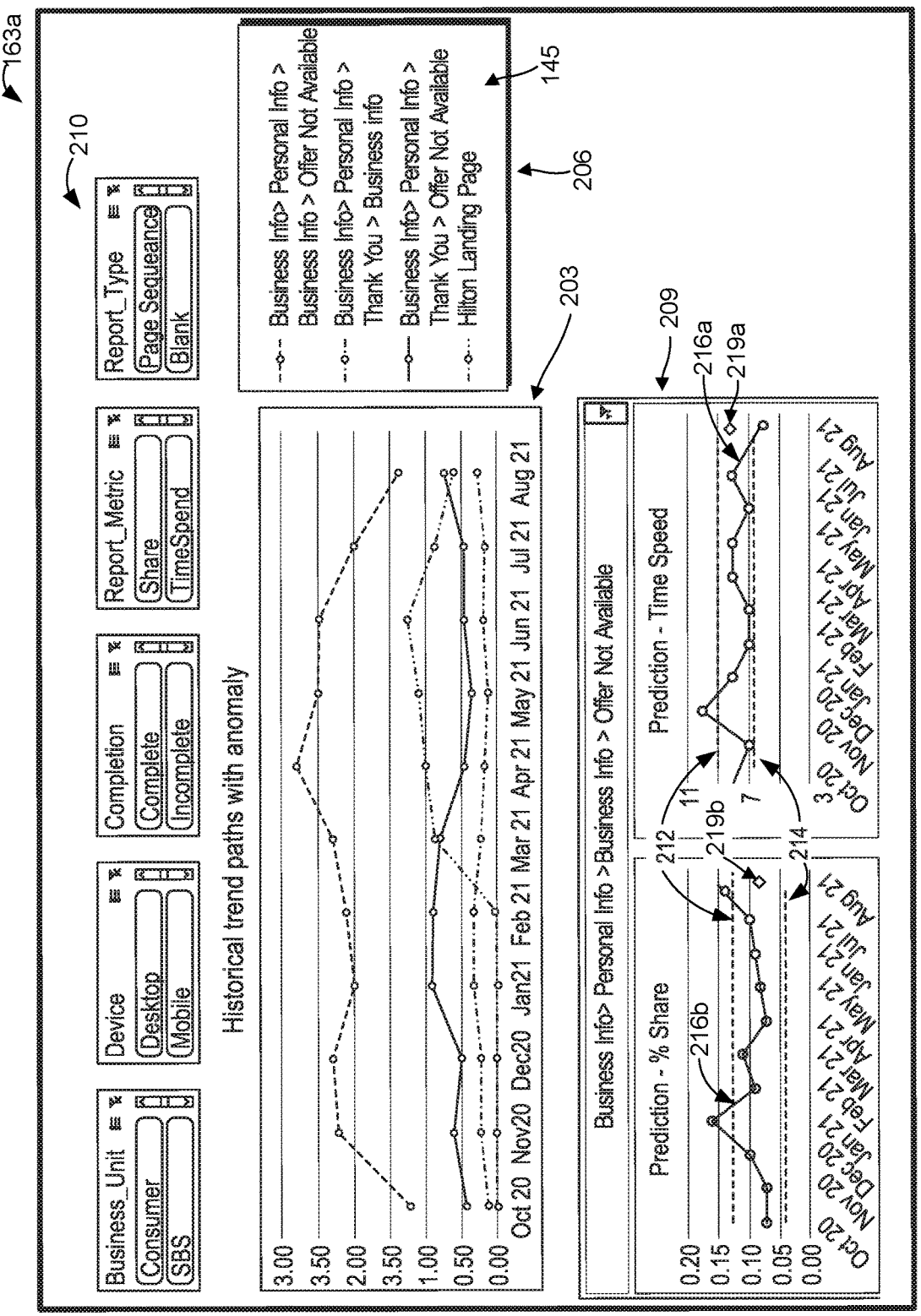
Figure 2C:
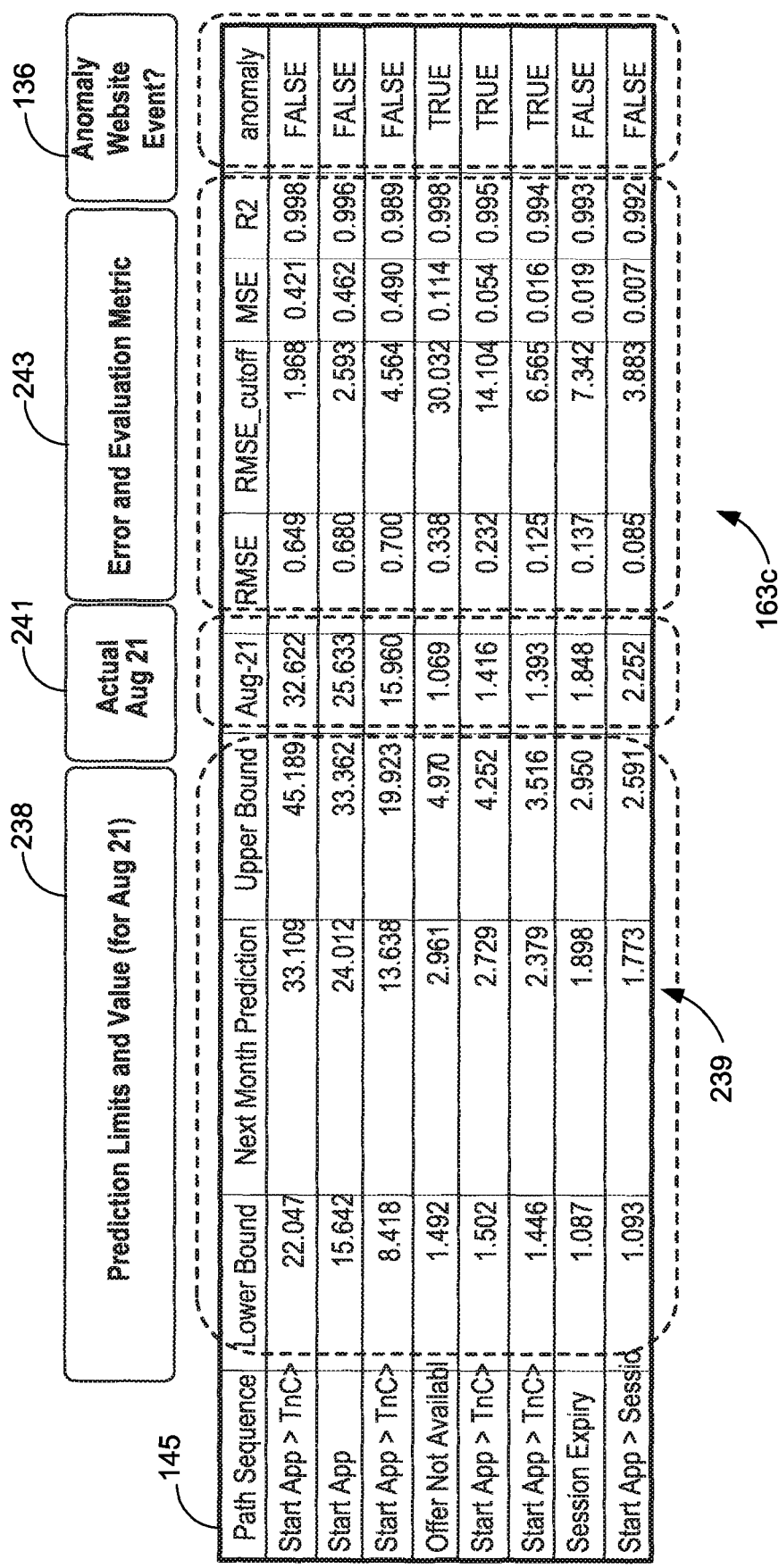

Turning now to FIGS. 2A-2C, shown are analyst user interfaces 163a-163c (collectively "analyst user interfaces 163") that are displayed for authorized operators in the networked environment 100. In FIG. 2A, shown is an example of a first analyst user interface 163a displayed by the analyst client device 109 in the networked environment 100. The first analyst user interface 163a includes a graphical component 203, a graph legend component 206, a selected path window 209, filters 210, and other suitable components. The graphical component 203 displays a clickstream metric (e.g., the page completion time 151, a percentage of a total quantity of client device visits to a specific website navigation sequence 145, an estimated period of time spent during a website session 142) for four different website navigation sequences 145. The four different website navigation sequences 145 can represent four unique sequences performed by one or more client devices 106. The four graphs of the website navigation sequences 145 are displayed because they each have an anomaly website event 136 that occurred in their sequence. The four graphs display historical trends of an average clickstream metric every month. The graph legend component 206 displays the specific sequence of web pages visited for each website navigation sequence 145 displayed in the graphical component 203.

The filters 210 can be used to select one or more website navigation sequences 145 to display in the graphical component 203 and the graph legend component 206. The filters 210 enable an operator to select which criteria to use to select the website navigation sequences 145. Some non-limiting examples of criteria can include a business unit of an entity managing the website, device type (e.g., desktop, mobile phone, tablet, etc.), completion status for a user task associated with the website navigation sequence 145 (e.g., complete, incomplete), report metric (e.g., share, time spend), report type, and other suitable filters associated with the website navigation sequence 145.

The selected path window 209 displays a selected website navigation sequence 145. The selected path window 209 displays an upper bound threshold 212, a lower bound threshold 214, actual measurement graphs 216*a-b*, a predicted value 219*a-b* for a next measurement, and other suitable components. The upper bound threshold 212 and the lower bound threshold 214 can be adjusted or recalculated on a periodic basis, such as every month, every week, and other suitable time periods. The upper bound threshold 212 and the lower bound threshold 214 can be determined based on the predicted value 219*a-b*.

The actual measurement graphs 216*a-b* represent measurements that were recorded (e.g., an actual page completion time 151) for a time period (e.g., the month of August). The actual measurement graphs 216*a-b* and the predicted value 219*a-b* measurements can represent an average value for multiple client devices 106 that performed the selected website navigation sequences 145. The error detection service 118 can identify whether the website navigation sequence 145 has an anomaly website event 136 by comparing the last actual measurement value in the actual measurement graphs 216*a-b* with the upper bound threshold 212 and/or the lower bound threshold 214. In the illustrated example, the actual measurement graph 216*b* has a last actual measurement that is beyond the upper bound threshold 212 for the percentage share measurement. Likewise, the actual measurement graph 216*a* has a last actual measurement that is below the lower bound threshold 214. Thus, the selected website navigation sequence 145 would be identified as having an anomaly website event 136 based at least in part on either the page completion time comparison and/or from the percentage share measurement.

Moving on to FIG. 2B, shown is an example of a second analyst user interface 163*b* displayed by the analyst client device 109 in the networked environment 100. The second analyst user interface 163*b* can be used by an authorized operator to manually classify the website navigation sequences 145, in which the authorized operator can select an anomaly type 122 (e.g., Limited Time Offer, a New Tag, a Technical Error, Market Trend) using a user interface selection component 225. Typically, the authorized operator will enter the anomaly type 122 after investigating the root cause of the anomaly website event 136 for the website navigation sequence 145. Thus, the manual classification can be provided as feedback data (e.g., training data for the machine learning models) for the anomaly detection service 124 and/or the anomaly labeling service 127. As a result, the feedback data can be provided to the machine learning models used by the anomaly detection service 124 and/or the anomaly labeling service 127. In some instances, the feedback data can be used to correct a previous identified anomaly website event 136 or a previous classified anomaly type 122 for the website navigation sequence 145, which will improve the accuracy of the next predictions and reduce the quantity of false positives.

Turning now to FIG. 2C, shown is an example of a third analyst user interface 163*c* displayed by the analyst client device 109 in the networked environment 100. The third analyst user interface 163*c* can include prediction limits and values 238, an actual measurement value 241, an error and evaluation metric 243, an anomaly website event 136, and other suitable data. The third analyst user interface 163*c* displays output data that is generated by the anomaly detection service 124.

The prediction limits and values 238 can represent the calculations of the upper bound threshold 212, the lower bound threshold 214, the next time period predicted value 219*a-b*, and other suitable data. As shown, these values can be different for each website navigation sequence 145 for a particular time period (e.g., values are shown for the month of August 2021). These values can be recalculated periodically (e.g., every month), on-demand, or in real-time.

The actual measurement value 241 can represent the last actual measurement (e.g., actual measurement average for a set of client devices 106) for the website navigation sequence 145. The actual measurement value 241 can be compared with the upper bound threshold 212 and/or the lower bound threshold 214 for determining whether there is an anomaly website event 136.

The error and evaluation metrics 243 can represent data metrics for evaluating the machine learning models employed by the anomaly detection service 124. In some embodiments, if the data metrics fall below a particular model threshold, then the error detection service 118 can initiate a training process for improving the accuracy of the machine learning models used by the anomaly detection service 124. For example, in the event of the data metrics failing below an accuracy model threshold, the training process can include disabling the use of the anomaly detection service 124 and displaying one or more user interfaces (e.g., the second analyst user interface 163*b*) for training the machine learning models (e.g., providing feedback data). The anomaly website event 136 can represent an indication of whether the website navigation sequence 145 has been identified or predicted as having an anomaly website event 136.

In some embodiments, the output data is displayed for an authorized operator on the analyst user interface 163. The output data can be provided to the anomaly labeling service 127 for determining an anomaly type 122 for the subset of website navigation sequences 145 that have been identified as having an anomaly website event 136.

Figure 3:
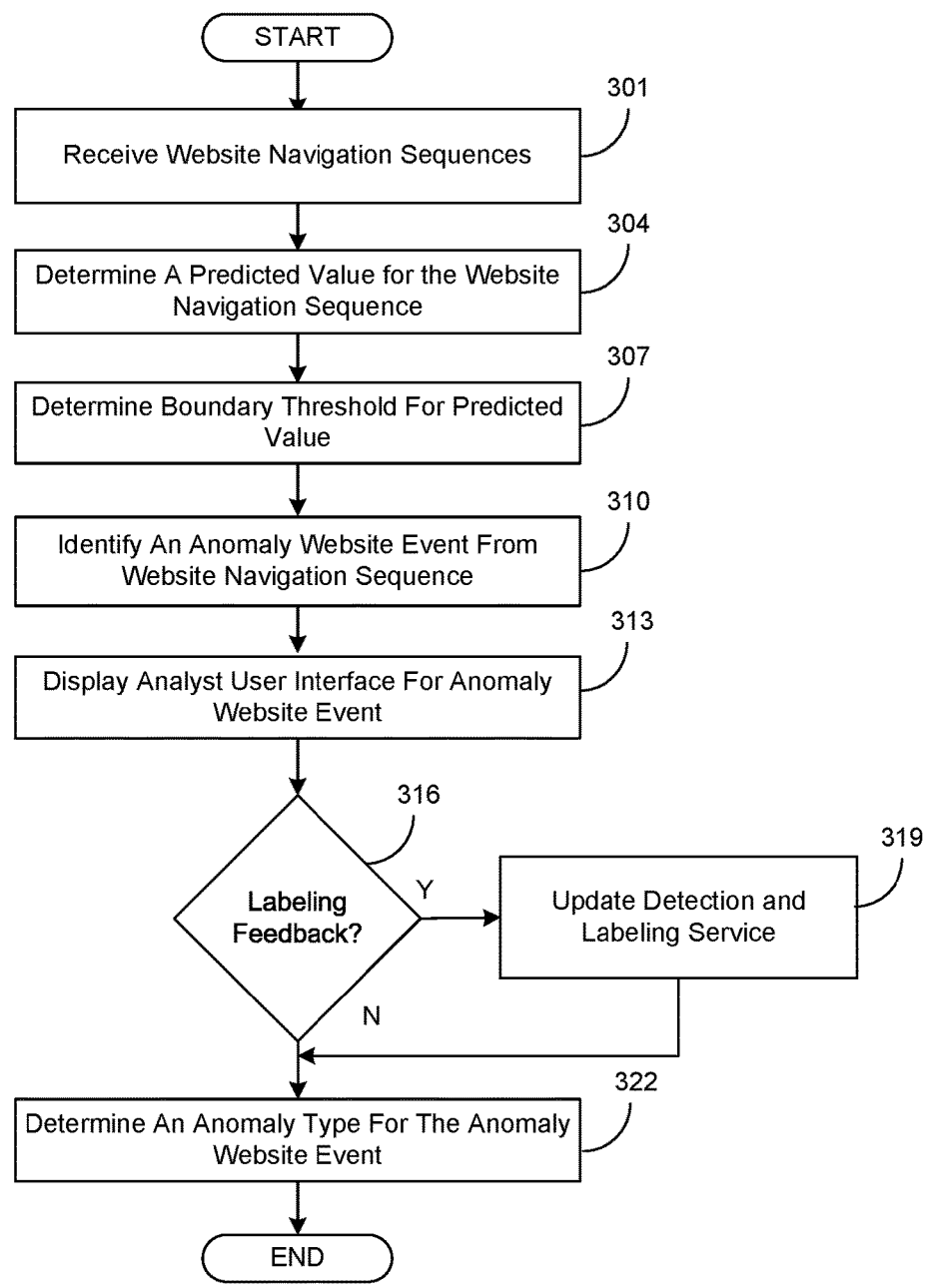
FIG. 3 is a flowchart illustrating one example of functionality implemented as portions of an error detection service executed in a computing environment in the networked environment of FIG. 1A according to various embodiments of the present disclosure.

Referring next to FIG. 3, shown is a flowchart that provides one example of the operation of a portion of the error detection service 118 according to various embodiments. The error detection service 118 can identify anomaly website events 136 from clickstream data 130 (e.g., website navigation sequences 145). The error detection service 118 can also determine an anomaly type 122 for each of the identified anomaly website events 136. It is understood that the flowchart of FIG. 3 provides merely an example of the many different types of functional arrangements that can be employed to implement the operation of the portion of the error detection service 118 as described herein. As an alternative, the flowchart of FIG. 3 can be viewed as depicting an example of elements of a method implemented in the computing environment 103 (FIG. 1A) according to one or more embodiments.

Beginning with box 301, the error detection service 118 can receive website navigation sequences 145 for one or more device identifiers 143. The website navigation sequences 145 can be received on a periodic time period, such as every hour, every day, every week, every month, and other suitable time frames. The website navigation sequences 145 can also be received on-demand, in real-time or substantially real-time, and at other suitable occasions. The website navigation sequences 145 can be generated from clickstream data 130. In some embodiments, the website navigation sequences 145 are generated by the error detection service 118.

The website navigation sequence 145 can include page transition sequences 148, page completion times 151, page elements 154, data entered by the user of the client device 106, tasks performed on the website (e.g., applying for a service, filling out an application for a transaction account, etc.), a volume or share of website sessions 142 following a specific website navigation sequence 145, and other suitable data collected using digital data collection techniques.

In box 304, the error detection service 118 can determine a predicted value for the website navigation sequence 145. In some example implementations, the error detection service 118 can use the anomaly detection service 124 to generate the predicted value. The predicted value can be one or more timed measurements collected from the clickstream data 130. For example, the predicted value can be a timed measurement for a device identifier 143 to navigate through the website navigation sequence 145. For instance, the predicted value can be a page completion time 151 for navigation through the website navigation sequence 145, which can be a time to navigate through five different web pages.

In another example, the page completion time 151 can be a timed measurement of a device identifier 143 navigation through a series of web pages to order, to complete a task, such as apply for a transaction account, to request a service, to purchase one or more particular products, and other suitable tasks. The predicted value can be other clickstream metrics.

The anomaly detection service 124 can generate the predicted value using a time series regression model based at least in part on the clickstream data 130 for a time period (e.g., the time period can be set to a month, a week, a day, etc.). The predicted value can be determined for one or more measured metrics from the clickstream data 130. For example, the predicted value can be calculated for a page completion time 151 based at least in part on the page completion time 151 measured for the past month time period for various website navigation sequences 145. In this instance, the predicted value can represent the expected or predicted value for the page completion time 151 for the next measurement of the page completion time 151 for a particular website navigation sequence 145. Thus, a different website navigation sequence 145 can have a different predicted value for the page completion time 151. In some examples, the time series regression model can use an additive model or function with two main components: trend and seasonality. In general, the form of the model is as below::

$$Y = \beta_0 + \Sigma_{j=1}^{p} Pf_j(x_j) + \varepsilon.$$

We have p predictors $x_j$, each with a $f_j(x_j)$ non-linear or linear smooth univariate function, and $\varepsilon$ represents an error component. The input data can be a metric associated with the website navigation sequence 145, such as an average page completion time for one or more previous months. The additive model or function can output the predicted value for the next time period (e.g., FIG. 2C (239), and the additive model can be recalculated every time period based at least in part on the recent clickstream data 130 (e.g., from the previous time period) associated with the website navigation sequence 145.

In box 307, the error detection service 118 can determine a boundary threshold for the predicted value. In some embodiments, the boundary threshold can include a range between an upper bound threshold 212 and a lower bound threshold 214, in which the upper bound threshold 212 and the lower bound threshold 214 are calculated based on the predicted value. The boundary thresholds can be calculated for each time period.

In some embodiments, the upper bound threshold 212 and lower bound threshold 214 can be calculated by estimating an uncertainty interval around the predicted value. The estimation can be calculated using Markov Chain Monte Carlo iterations to calculate multiple models based on simulated data samples, generated by varying the algorithm parameters. Further, the estimation can be determined based at least in part on a user specified threshold confidence level (e.g., entered via an analyst user interface 163). Thus, the boundary thresholds can be based on the predicted value and the threshold confidence level. As such, the boundary thresholds can be different every month since they are calculated based on the clickstream data 130 for the month.

In box 310, the error detection service 118 can identify an anomaly website event 136 from the website navigation sequence 145 via the anomaly detection service 124. In some embodiments, the anomaly detection service 124 can identify an actual measurement for the metric that is being analyzed. For instance, continuing from the previous example, the anomaly detection service 124 can identify an actual measurement for the page completion time 151 (e.g., an actual page completion time).

The actual page completion time can be compared to a boundary threshold. In some embodiments, the actual page completion time compared to the upper bound threshold 212 and the lower bound threshold 214. If the actual page completion time is below the upper boundary threshold and above the lower boundary threshold, then the anomaly detection service 124 can determine the actual completion time is not an anomaly website event 136. In another instance, if the actual completion time is above the upper boundary threshold or below the lower boundary threshold, then the anomaly detection service 124 can identify the actual completion time as an anomaly website event 136.

For example, the predicted value for the website navigation sequence 145 can be calculated to be ten minutes. The upper boundary threshold can be determined to be thirteen minutes and the lower boundary threshold can be determined to be eight minutes. If the actual completion time is measured to be fifteen minutes, the website navigation sequence 145 can be identified as having an anomaly website event 136 because of the actual completion time being outside of the upper boundary threshold.

In box 313, the error detection service 118 can display analyst user interfaces 163 for one or more identified website navigation sequences 145 having an anomaly website event 136. The first analyst user interface 163a can display visualizations associated with the website navigation sequences 145. The website navigation sequences 145 displayed can include a first website navigation sequence 145 that has an anomaly website event 136 and several other website navigation sequences 145 that do not have an anomaly website event 136. As a result, the first analyst user interface 163a can be used to display these website navigation sequences 145 for comparison.

In box 316, the error detection service 118 can determine whether labeling feedback has been received from the analyst client device 109 via the analyst user interfaces 163. If there is labeling feedback, the error detection service 118 can proceed to box 319. If there is no labeling feedback, the error detection service 118 can proceed to box 322.

In box 319, the error detection service 118 can determine to update the anomaly detection service 124 and anomaly labeling service 127. In some instances, an operator (e.g., an analyst or a software developer) of the analyst user interface 163 can research the anomaly website event 136 to identify the root cause of the anomaly website event 136. The operator can manually classify the anomaly website event 136 as an anomaly type 122. The manual classification can be provided as an input to the machine learning models for the anomaly detection service 124 and the anomaly labeling service 127. In some embodiments, the manual classification can be provided after the anomaly type 122 has been predicted by the anomaly labeling service 127.

In box 322, the error detection service 118 can determine an anomaly type 122 for an anomaly website event 136. The error detection service 118 can use the anomaly labeling service 127 to determine the anomaly type 122 for the anomaly website event 136 identified in a particular website navigation sequence 145. The anomaly labeling service 127 can use one or more machine learning models that have been trained using historical navigation sequence data 133 (e.g., previous anomaly website events and a corresponding classification for the anomaly website event).

The anomaly labeling service 127 can determine or predict an anomaly type 122 by using a machine learning model to determine a respective confidence level for each of the possible anomaly types 122 for the website navigation sequence 145. For example, the machine learning model estimates a first probability level (e.g., a first confidence level) that the anomaly website event 136 was caused by a promotional offer. The machine learning model estimates a second probability level (e.g., a second confidence level) that the anomaly website event 136 was caused by a technical error. The machine learning model estimates a third probability level (e.g., a third confidence level) that the anomaly website event 136 was caused by a market trend. The anomaly detection service 124 can select the anomaly type 122 from among the three by choosing the one that has the highest probability level. Further, if the highest probability level does not meet a minimum accuracy threshold, then the anomaly detection service 124 can initiate an update of the machine learning models for the anomaly detection service 124. The update process can involve displaying one or more analyst user interfaces 163 for receiving training data to improve the labeling accuracy of the anomaly types 122. Then, the error detection service 118 proceeds to completion.

Figure 4:
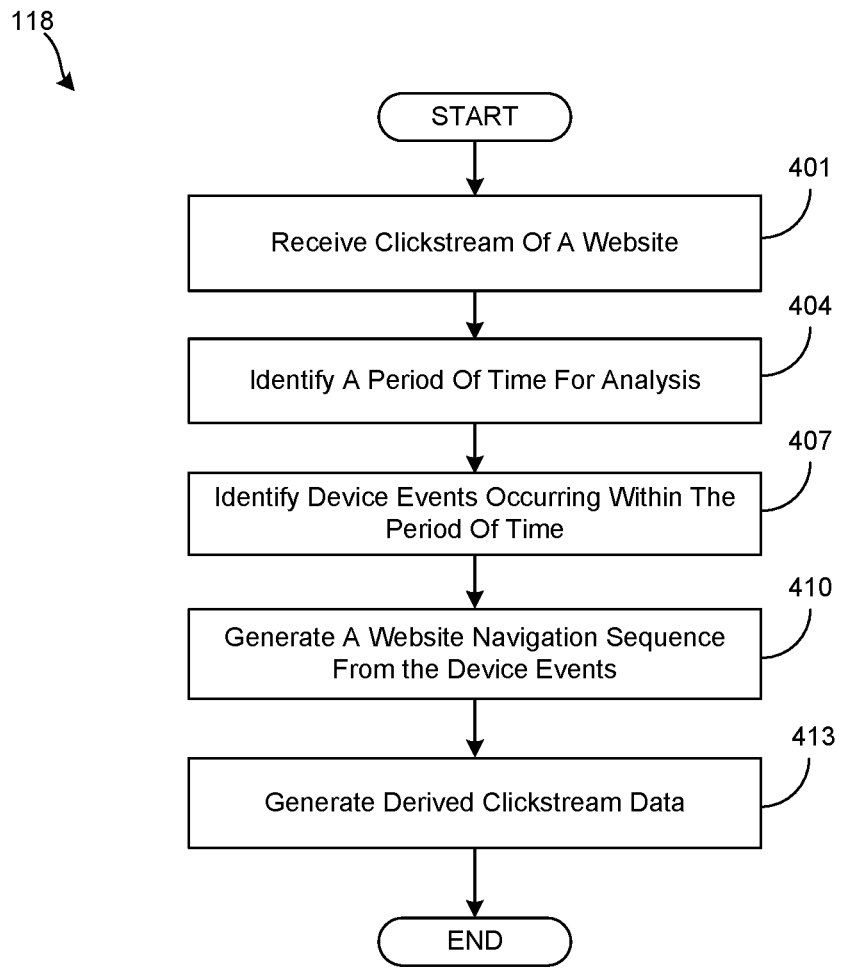
FIG. 4 is a flowchart illustrating one example of functionality implemented as portions of an error detection service executed in a computing environment in the networked environment of FIG. 1A according to various embodiments of the present disclosure.

Referring next to FIG. 4, shown is a flowchart that provides one example of the operation of a portion of the error detection service 118 according to various embodiments. The error detection service 118 can be executed to generate one or more website navigation sequences 145 that describe an order of device events 144 associated with one or more client devices 106. The website navigation sequences 145 can be generated from clickstream data 130. It is understood that the flowchart of FIG. 4 provides merely an example of the many different types of functional arrangements that can be employed to implement the operation of the portion of the error detection service 118 as described herein. As an alternative, the flowchart of FIG. 4 can be viewed as depicting an example of elements of a method implemented in the computing environment 103 (FIG. 1A) according to one or more embodiments.

Beginning with box 401, the error detection service 118 can receive clickstream data 130 for a website. The clickstream data 130 can be generated on a periodic time period, such as, for example, every hour, every week, every month, every year, and other suitable time frames. In some embodiments, the clickstream data 130 can be received in real-time or substantially real-time. In these embodiments, the clickstream data 130 can be generated by the error detection service 118. The clickstream data 130 can be generated using one or more digital data collection techniques, such as using JavaScript tags, a tag manager, server-side tagging, and other suitable digital data collection techniques. Alternatively, in other embodiments, the other services can generate the clickstream data 130 and provide it to the error detection service 118. In some embodiments, the clickstream data 130 can represent a set of raw data (e.g., Big data) collected using one or more digital data collection techniques. In some instances, the clickstream data 130 can be unorganized. Some non-limiting examples of data elements collected from a website can include device identifiers 143, device events 144, website sessions 142, and other suitable data elements. Each data element in the clickstream data 130 can have a particular time stamp that represents an indication of when the data element (e.g., a device event 144) occurred or was performed in association with the client device 106.

In box 404, the error detection service 118 can identify a period of time (e.g., daily, weekly, monthly, etc.) for analysis for error detection. In some examples, the period of time can be selected by an operator. Within the period of time, the error detection service 118 can identify a device identifier 143 and a website session 142 from the clickstream data 130. In some example implementations, one or more device identifiers 143 and/or one or more website sessions 142 can be identified based at least in part on a user-specified criteria.

In some example implementations, the error detection service 118 can select a particular device identifier 143 of a client device 106 and identify a particular website session 142. The website session 142 can have a start time stamp and an ending time stamp. The time period between the start time stamp and the ending time stamp can represent a period of time that the device identifier 143 (e.g., client device 106) is actively interacting with a website. Some non-limiting examples of active interactions can include navigating to one or more web pages, entering data into data fields on a web page, clicking on user interface components on a web page, viewing content (e.g., static content and dynamic content) and other suitable interactions with a web page. Some other examples of active interactions can include starting a task (e.g., applying for a transaction account, applying for an increase of a credit limit, setting up a payment plan, redeeming reward points, initiating a customer service request, initiating a purchase), completing a task, and other suitable interactions. Additionally, in some examples, the error detection service 118 can calculate the session time period 146 based at least in part on a difference between the first interaction and the last interaction during the website session 142, in which the last interaction can be session termination (e.g., inactivity determination, closing a browser application, etc.).

In box 407, the error detection service 118 can identify various device events 144 occurring within a specific period of time for the device identifier 143 and the website session 142. Each device event 144 can have an event time stamp 149. The error detection service 118 can identify all of the device events 144 with an event time stamp 149 within the specific period of time. For example, the clickstream data 130 can indicate that a website session 142 (e.g., a website session identifier) had a start time of 10:00 AM EST and an end time of 10:15 AM EST. The error detection service 118 can identify three webpages that were visited by a particular device identifier 143 between the start time and the end time.

In box 410, the error detection service 118 can generate a website navigation sequence 145 from the identified device events 144. In some embodiments, the website navigation sequence 145 can be generated by determining an order of the device events 144 that occurred according to the event time stamps 149. As a non-limiting example, the three web pages can have event time stamps 149 of 10:14 AM (EST), 10:00 AM (EST), and 10:07 AM (EST). A generated website navigation sequence 145 can generate a sequence that includes when the earliest device event 144 occurred, the second device event 144 occurred and the last device event 144 occurred.

In box 413, the error detection service 118 can generate derived clickstream data. A non-limiting example of the derived clickstream data can include a volume of website sessions with similar characteristics or device events 144. Another example of derived clickstream data can include calculating an average time spent in each of the website navigation sequences 145.

In some embodiments, the error detection service 118 can identify a period of time for analysis. All of the device events 144 that occurred within all of the website sessions 142 for the period of time are selected. The error detection service 118 can aggregate all of the selected device events 144 and generate derived clickstream data, such as an estimated volume of sessions with certain characteristics, share/percentage, and average time spent in the session. Then, the error detection service 118 can proceed to completion.

Figure 5:
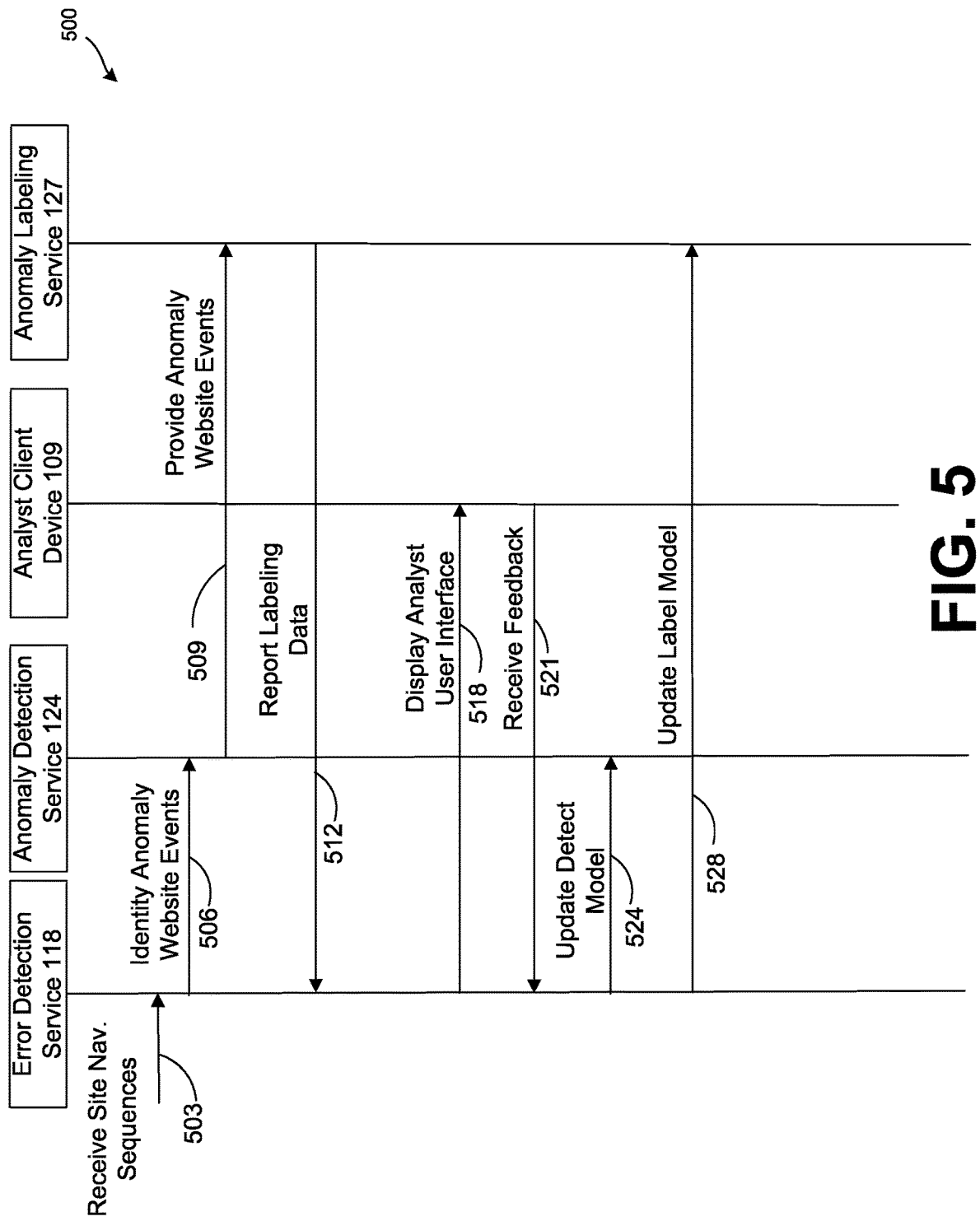
FIG. 5 is a sequence diagram of operations performed in the networked environment of FIG. 1A according to various embodiments of the present disclosure.

Next, moving to FIG. 5, shown is a sequence diagram 500 of operations performed in the networked environment 100. The sequence diagram 500 can represent an alternative embodiment from FIG. 3. The sequence diagram 500 relates to identifying anomaly website events 136 from website navigation sequences 145 and predicting an anomaly type 122 for each of the anomaly website events 136.

To begin, at box 503, the error detection service 118 can receive website navigation sequences 145. In some embodiments, the website navigation sequences 145 can be received on a periodic time period, such as every hour, every day, every week, every month, and other suitable time frames. The website navigation sequences 145 can also be received on-demand, in real-time or substantially real-time, and at other suitable occasions. In some embodiments, the website navigation sequences 145 are generated by the error detection service 118 from clickstream data 130.

In box 506, the error detection service 118 can provide the website navigation sequences to the anomaly detection service 124 in order to identify the anomaly website events 136. The anomaly detection service 124 can determine a predicted value for each of the website navigation sequences 145 based at least in part on one or more metric measurements collected from the clickstream data 130, such as page completion time 151, a percent of share of visits, or other suitable metrics that can be derived from the clickstream data 130.

Next, the anomaly detection service 124 can determine a boundary threshold for the predicted value. In some embodiments, the boundary threshold can include an upper bound threshold 212 and a lower bound threshold 214 that are calculated based on the predicted value. The boundary thresholds can be calculated for each time period calculated for the predicted value. Then, the anomaly detection service 124 can identify an actual measurement for the next time period.

Next, the anomaly detection service 124 can identify an anomaly website events 136 by comparing the actual measurement to one or more boundary thresholds. If the actual measurement is within one of the boundary thresholds, then the anomaly detection service 124 can determine the actual measurement is not an anomaly website event 136. In another instance, if the actual measurement is beyond a boundary threshold, then the anomaly detection service 124 can identify the actual measurement as an indicator of an anomaly website event 136 in the particular website navigation sequence 145. In some embodiments, the anomaly detection service 124 can identify a subset of the website navigation sequences 145 as having an anomaly website event 136.

At box 509, the anomaly detection service 124 can provide the anomaly website event data to the anomaly labeling service 127. The anomaly website event data can be the subset of the website navigation sequences 145 that have an identified anomaly website event 136 and clickstream data 130 associated with each of the subset of the website navigation sequences 145.

The anomaly labeling service 127 can determine an anomaly type 122 for each of the subset of website navigation sequences 145. The anomaly labeling service 127 can use one or more machine learning models that have been trained with previous website navigation sequences and their corresponding anomaly types 122 for determining the anomaly type 122.

At box 512, the anomaly detection service 124 can provide report labeling data to the error detection service 118. The report labeling data can a list of anomaly website events 136, their anomaly types 122, a confidence level associated with the anomaly types 122, and other suitable data.

At box 518, the error detection service 118 can display one or more analyst user interfaces 163 for displaying data related to the anomaly website events 136. In some examples, the analyst user interfaces 163 can display a report of the identified anomaly website events 136 and their predicted anomaly types 122 (e.g., identifying which anomaly website events 136 are predicted to be technical errors).

Additionally, the analyst user interfaces 163 can be used to display visualizations related to the website navigations sequences 145 associated with each of the anomaly website events. The authorized operator can use one or more of the analyst user interfaces 163 for investigating the root cause of the anomaly website events 136. In some embodiments, the second analyst user interface 163*b* can be used by the authorized operator to identify whether the anomaly website event 136 is correctly identified as an anomaly website event 136. Further, in some instances, the second analyst user interface 163*b* can verify if the anomaly type 122 is correctly predicted. Thus, the second analyst user interface 163*b* can be used to correct falsely identified anomaly website events and/or to fix incorrect anomaly types 122 for valid anomaly website events 136. This feedback data can be used to reduce false positives and improve the confident levels when predicting the anomaly types 122. In some embodiments, the second analyst user interface 163*b* can be used to enter whether the anomaly type 122 is correctly predicted by the anomaly labeling service 127. For example, the authorized operator can select "correct" or "incorrect" user interface component from the second analyst user interface 163*b*. If "incorrect" is selected, then the second analyst user interface 163*b* can display a user interface component for entering correct anomaly type 122. If "correct" is selected, the feedback data can be used to increase the confidence level at the anomaly label service 127 for subsequence classifications.

At box 521, the feedback data can be received by the error detection service 118. The feedback data can include one or more corrections identification of anomaly website events 136 and anomaly types 122 of valid anomaly website events 136. In some scenarios, box 521 can be omitted, particularly when there is no feedback data provided.

At box 524, the feedback data can be transmitted to the anomaly detection service 124. The feedback data can be used to update the machine learning models used to identify the anomaly website events 136 from website navigation sequences 145. In some scenarios, box 524 can be omitted, particularly when there is no feedback data provided.

At box 528, the feedback data can be transmitted to the anomaly labeling service 127. The feedback data can be used to update the machine learning models used to determine the anomaly types 122 for each of the anomaly website events 136. In some scenarios, box 528 can be omitted, particularly when there is no feedback data provided. Then, the sequence diagram 500 can proceed to completion.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagram of FIGS. 3, 4, and 5 represent the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagram of FIGS. 3, 4, and 5 follow a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagram of FIGS. 3, 4, and 5 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered file systems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, and/or Z, or any combination thereof (e.g., X; Y; Z; X and/or Y; X and/or Z; Y and/or Z; X, Y, and/or Z, etc.). Thus, such disjunctive language is not generally intended to, and should not, imply that certain embodiments require at least one of X, at least one of Y, and/or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
at least one computing device comprising a processor and a memory; and
machine-readable instructions stored in the memory that, when executed by the processor, cause the computing device to at least:
receive a website navigation sequence of a series of web page interactions between a client device and a website;
determine an expected completion time for a next measurement of the client device executing the website navigation sequence based at least in part on a first machine learning model being trained with historical navigation sequence data;
determine an actual completion time for the next measurement of the client device executing the website navigation sequence;
determine an anomaly website event in the website navigation sequence based at least in part on the actual completion time failing to meet a boundary threshold associated with the expected completion time; and
determine the anomaly website event is a website error based at least in part on a second machine learning model being trained with a plurality of previous website errors identified from a plurality of previous website navigation sequences.

2. The system of claim 1, wherein the first machine learning model is a time series regression model, and the boundary threshold is a range between a lower bound and an upper bound determined based at least in part on the expected completion time.

3. The system of claim 2, wherein at least one of the upper bound or the lower bound are determined based at least in part on a threshold confidence level and the expected completion time.

4. The system of claim 1, wherein the first machine learning model is a time series regression model, and the machine-readable instructions stored in the memory that, when executed by the processor, cause the computing device to at least:
generate an additive function for the first machine learning model based at least in part on the historical navigation sequence data, the additive function is used to generate the expected completion time for the next measurement.

5. The system of claim 1, wherein the machine-readable instructions stored in the memory that, when executed by the processor, cause the computing device to at least:
display a user interface that includes the anomaly website event for the website navigation sequence;
receive a specification of an anomaly type for the anomaly website event from the user interface; and
update the first machine learning model based at least in part on the anomaly type for the anomaly website event.

6. The system of claim 5, wherein the machine-readable instructions, when executed by the processor, cause the computing device to at least:
determine that a respective confidence level for one of a plurality of anomaly types fails to meet an accuracy threshold; and
update the second machine learning model based at least in part on the anomaly type for the anomaly website event based at least in part on the respective confidence level failing to meet the accuracy threshold.

7. The system of claim 1, wherein determining the anomaly website event is the website error further comprises machine-readable instructions that, when executed by the processor, cause the computing device to at least:
determine a respective probability level for each of a plurality of anomaly types for the anomaly website event based at least in part on the second machine learning model, wherein the plurality of anomaly types comprise the website error; and
select the website error from the plurality of anomaly types based at least in part on the website error having a highest probability level among the plurality of anomaly types.

8. A method, comprising
receiving, by a computing device, a website navigation sequence of a client device interacting with a website;
determining, by the computing device, a predicted value for a next measurement of the client device executing the website navigation sequence based at least in part on a first machine learning model being trained with historical navigation sequence data;
determining, by the computing device, an actual value for the next measurement of the client device executing the website navigation sequence;
determining, by the computing device, an anomaly website event in the website navigation sequence based at least in part on the actual value failing to meet a boundary threshold associated with the predicted value; and determining, by the computing device, an anomaly type for the anomaly website event based at least in part on a second machine learning model being trained with a plurality of previous anomaly website events from a plurality of previous website navigation sequences being classified as a plurality of previous anomaly types.

9. The method of claim 8, wherein the anomaly type comprises at least one of: a website error, a promotional offer, or a new tag.

10. The method of claim 8, wherein the first machine learning model is a time series regression model, and the boundary threshold is a range between a lower bound and an upper bound determined based at least in part on the predicted value.

11. The method of claim 8, wherein the first machine learning model is a time series regression model, and further comprising:

generating an additive function for the first machine learning model based at least in part on the historical navigation sequence data, the additive function being used to generate the predicted value for the next measurement.

12. The method of claim 8, further comprising:

displaying, by the computing device, a user interface that includes the anomaly website event for the website navigation sequence;

receiving, by the computing device, a specification of an updated anomaly type for the anomaly website event from the user interface; and updating, by the computing device, the first machine learning model based at least in part on the updated anomaly type for the anomaly website event, wherein the updated anomaly type replaces the anomaly type.

13. The method of claim 12, further comprising:

determining, by the computing device, that a respective confidence level for one of a plurality of anomaly types fails to meet an accuracy threshold; and updating, by the computing device, the second machine learning model based at least in part on the anomaly type for the anomaly website event based at least in part on the respective confidence level failing to meet the accuracy threshold.

14. The method of claim 8, further comprising:

determining, by the computing device, a respective probability level for each of a plurality of anomaly types for the anomaly website event based at least in part on the second machine learning model; and selecting, by the computing device, that a website error from the plurality of anomaly types for the anomaly website event based at least in part on the website error having a highest probability level among the plurality of anomaly types.

15. The method of claim 8, wherein the boundary threshold is a range between a lower bound and an upper bound, at least one of the lower bound and the upper bound are determined based at least in part on a percentage of a total of the website navigation sequences.

16. A system, comprising:

at least one computing device comprising a processor and a memory; and machine-readable instructions stored in the memory that, when executed by the processor, cause the computing device to at least:

receive clickstream data that comprises a plurality of device identifiers, a plurality of device events, and a plurality of session identifiers, the plurality of device identifiers representing a plurality of client devices that have interacted with a website, the plurality of session identifiers representing a period of time in which one of the plurality of client devices generated at least one of the plurality of device events, the plurality of device events representing a plurality of interactions with the website;

identify a period of time associated with a respective session identifier and a respective device identifier for a respective client device from the clickstream data;

identify a subset of the plurality of device events that occurred within the period of time of the respective session identifier for the respective client device, the subset of the plurality of device events are identified based at least in part on an event time stamp associated with individual ones of the plurality of device events being within the period of time; and generate a website navigation sequence of the subset of the plurality of device events for the respective client device based at least in part on the event time stamp for each of the subset of the plurality of device events.

17. The system of claim 16, wherein the website navigation sequence comprises a sequence of a plurality of web pages associated with the website that have been displayed on the respective client device.

18. The system of claim 16, wherein the period of time of the respective session identifier comprises a completion time for the respective client device to complete a task over a plurality of web pages.

19. The system of claim 16, wherein the plurality of device events comprise at least one of: the respective client device entering data into a particular data field, the respective client device interacting with a user interface component on a web page, or an amount of time spent viewing a portion of a web page.

20. The system of claim 16, wherein the machine-readable instructions, when executed by the processor, cause the computing device to at least:

determine a plurality of website navigation sequences for a remaining portion of the plurality of device identifiers based at least in part on the clickstream data; and determine a device subset of the plurality of device identifiers that have a particular website navigation sequence among the plurality of website navigation sequences that corresponds to the website navigation sequence.

* * * * *